United States Patent Office 3,551,104
Patented Dec. 29, 1970

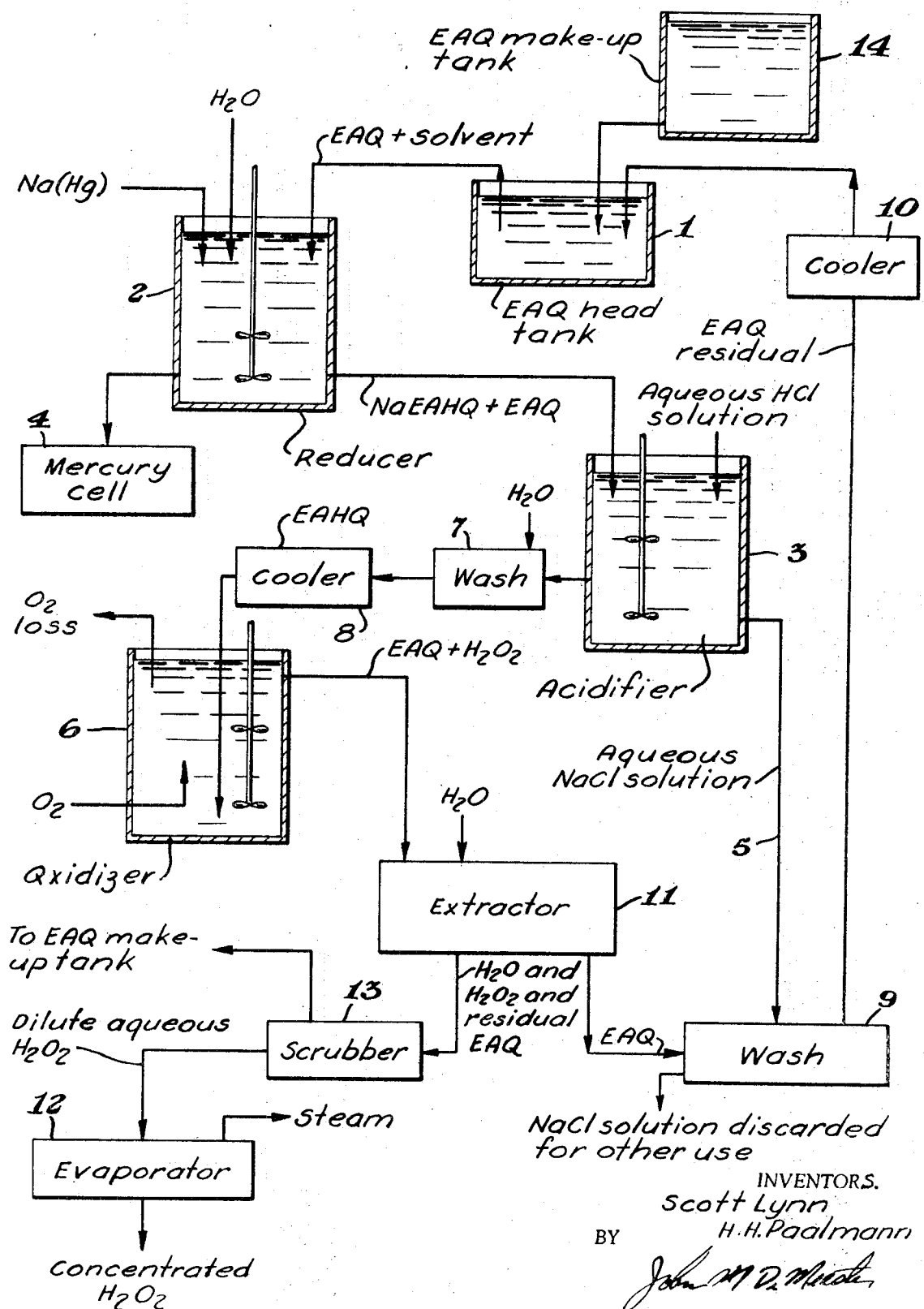

1

3,551,104
METHOD OF PREPARING HYDROGEN PEROXIDE
Scott Lynn and Hendrick Hunter Paalman, Walnut Creek, Calif., assignors to The Dow Chemical Company, Midland, Mich., a corporation of Delaware
Continuation-in-part of application Ser. No. 565,783, July 18, 1966. This application Apr. 29, 1969, Ser. No. 824,355
Int. Cl. C01b 15/02; C07c 49/68
U.S. Cl. 23—207
8 Claims

ABSTRACT OF THE DISCLOSURE

Hydrogen peroxide is produced by contacting an anthraquinone dissolved in a liquid reaction system made up of a continuous water immiscible organic solvent phase and a distinct dispersed water phase, with an alkali metal amalgam wherein said liquid reaction system contains from about 0.1 to about 2 moles of said anthraquinone per liter of said solvent and said alkali metal amalgam is present in an amount ranging from about 0.1 to about 2.0 gram atoms of alkali metal per mole of said anthraquinone. The alkaline reaction system produced in the above reaction is neutralized with an acid and the organic phase is separated and contacted with an oxygen containing gas to prepare hydrogen peroxide.

CROSS-REFERENCE TO RELATED APPLICATION

This application is a continuation-in-part of application Ser. No. 565,783, filed July 18, 1966 now abandoned.

BACKGROUND OF THE INVENTION

In conventional processes for preparing hydrogen peroxide by the anthraquinone process, as it is called by those skilled in the hydrogen peroxide art, a solution of an anthraquinone reactant is hydrogenated with the aid of a catalyst to the quinhydrone form. This product is separated from the catalyst and auto-oxidized forming hydrogen peroxide and regenerating the anthraquinone reactant.

It has also been suggested in the art that anthraquinone can be reduced directly to anthrahydroquinone by reacting it with water and sodium amalgam.

There are certain disadvantages inherent in both of these reduction methods when utilized as a step in preparing hydrogen peroxide. For example, there can be over-reduction to the tetrahydroanthraquinone by both reducing methods causing reactant and/or product losses and reducing the chemical activity of the solution. The hydrogenation reaction employing a catalyst is relatively slow and a large reactor normally is required. The use of a catalyst is uneconomical, and also any suspended catalyst must be very carefully removed from the product to avoid subsequent degradation of the hydrogen peroxide product.

A principal object of the present invention, therefore, is to provide an improved process for preparing hydrogen peroxide.

A further object of the present invention is to provide an advantageous improvement in the anthraquinone process of producing hydrogen peroxide whereby the hydrogenation catalyst heretofore required is eliminated along with the problems associated with its loss and recovery.

An additional object is to provide a novel method of making dialkali metal salts of anthrahydroquinones.

A related object is to provide an improvement in the anthraquinone process whereby inherent difficulties in the process, as practiced heretofore for producing hydrogen peroxide, are greatly minimized if not entirely eliminated.

SUMMARY OF THE INVENTION

It has been discovered that the dialkali metal salt of anthrahydroquinone can be prepared directly from an anthraquinone reactant, even in the presence of water, if an anthraquinone reactant is dissolved in a liquid organic solvent and reacted with an alkali metal amalgam. The liquid organic solvent should constitute a continuous phase with water and amalgam being dispersed therein as distinct phases.

By maintaining pH conditions during the reduction such that the produced hydroquinone is present essentially in the form of its anion, i.e. as the alkali metal salt, over-reduction is greatly reduced.

When the above reduction method is employed as a step in the preparation of hydrogen peroxide the reaction mass containing the alkali metal salt of anthrahydroquinone is preferably neutralized with an acid or acid material to form anthrahydroquinone; the anthrahydroquinone solution is separated from alkali metal salts of the acid employed and then auto-oxidized in the manner known in the art to prepare hydrogen peroxide and regenerate the anthraquinone reactant.

By carrying out the reduction step in this improved manner, over-reduction of the anthraquinone reactant to unpreferred compounds such as, tetrahydroanthraquinone, is substantially decreased as evidenced by the high degree of conversion to the anthrahydroquinone compounds upon subsequent neutralization of the reduction reaction mass.

BRIEF DESCRIPTION OF THE DRAWING

The accompanying drawing comprises a flow diagram of one embodiment of the process steps of the invention showing reactants, products and flows of material, as will be described in detail hereinafter.

DETAILED DESCRIPTION OF THE INVENTION

In the practice of the present invention an anthraquinone reactant, e.g. 2-ethyl anthraquinone (EAQ), is dissolved in a liquid organic solvent, and is reacted at a temperature of less than about 100° C. and preferably from about 40° to 60° C. with an alkali metal amalgam, e.g., sodium amalgam, preferably in the presence of water to provide a reaction mass containing the alkali metal salt of the respective anthrahydroquinone. The amalgam and water are provided as separate distinct phases dispersed in the liquid organic solvent such that the solvent is present as a continuous phase. The reaction mass is substantially neutralized, e.g. by contact with an acid such as aqueous hydrochloric acid, to generate the corresponding anthrahydroquinone itself, e.g. ethylanthrahydroquinone (EAHQ), dissolved in the organic solvent. The organic solution of the anthrahydroquinone is separated from co-produced alkali metal salts of the inorganic acid. The anthrahydroquinone dissolved in the organic solvent is then auto-oxidized at a temperature not exceeding about 100° C., and preferably not exceeding about 50° C. with an oxygen-containing gas, such as pure oxygen or air, for example, to form hydrogen peroxide and to regenerate the anthraquinone reactant. The regenerated anthraquinone reactant is recovered and ordinarily recycled for use in the process, as will be described more fully hereinafter. The hydrogen peroxide product is separated and recovered from the organic solvent by various methods such as, for example, extraction from the organic solution with water, or by distillation with appropriate precautions. When the peroxide is recovered by extraction, the aqueous extract can be used directly or can be concentrated to a predetermined strength by evaporation. By means of the present novel improvement very high yields of high purity hydrogen peroxide are obtained.

Anthraquinone reactants which exhibit a solubility in liquid organic solvents are operable in the present invention. Preferably alkyl anthraquinones wherein the alkyl group contains from 1 to about 4 carbon atoms are employed. Specific examples of alkyl anthraquinones which may be employed in the practice of the invention include: 2-methyl anthraquinone, 2-ethyl anthraquinone, 2-isopropyl anthraquinone, 2-sec butyl anthraquinone and 2-tert butyl anthraquinone. 2-ethyl anthraquinone is a preferred reactant from the standpoint of cost and availability. t-Butyl anthraquinone is more soluble and is therefore preferred from the standpoint of process efficiency and flexibility of operation.

Organic solvents which can be employed herein include water immiscible solvents and mixtures of solvents in which the anthraquinone reactant is sufficiently soluble at the reduction temperatures employed to provide a reasonable reaction rate and not require an inordinate amount of solvent. Preferably the solvent is one in which the anthraquinone reactant is soluble to at least the extent of 50 grams of anthraquinone per liter of solvent at the temperature employed during the reduction step.

Further, the solvent should preferably be one in which alkali metal salts of anthrahydroquinones are not appreciably soluble at the reduction temperature employed.

The solvent should also be one in which an anthrahydroquinone is not appreciably soluble at the reduction temperature, and preferably is soluble at the maximum of 100 grams per liter of solvent at such temperature. However, the solvent should be one in which the anthrahydroquinone is sufficiently soluble at the temperature employed during the auto-oxidation step to provide an efficient oxidation step. Preferably the solvent is one in which the anthrahydroquinone is soluble in an amount of at least 10 grams per liter of solvent at the temperature at which the subsequent auto-oxidation is to be carried out.

The solvent should preferably be employed in an amount at least equal to about one liter of solvent per 100 grams of anthraquinone reactant to be converted to the alkali metal salt of the anthrahydroquinone.

The actual concentration of a given anthraquinone reactant to be used depends, at least in part, on the solubility thereof in the solvent at the temperature being employed. Preferably from about 0.1 to about 2.0 moles of anthraquinone are employed per liter of solvent. For convenience, ordinarily the organic solvent employed is saturated with the anthraquinone reactant at a temperature of from about 20° to 25° C.

In general, from about 0.1 gram atom to about 2.0 gram atoms of alkali metal are employed per mole of the anthraquinone reactant dissolved in the solvent. Preferably less than 2 gram atoms of alkali metal are employed per mole of anthraquinone and most preferably the ratio is no more than about 1 gram atom of alkali metal per mole of anthraquinone reactant.

Suitable organic solvents in which the anthraquinone reactant can be readily dissolved include, for example, trialkyl phosphates, such as tributyl phosphate, hydrocarbons, such as diethyl benzene and triethyl benzene; aliphatic alcohols, e.g. 2-octanol, triaryl phosphates, trialkylaryl phosphates, organic aromatic liquids such as, for example, xylene, and the like. In general, examples of solvents which may be employed are set forth, e.g., in U.S. Pats. 2,537,655; 2,768,065; 2,935,381 and 2,768,066. As indicated normally, a solvent or solvent mixture is employed which will dissolve both the anthraquinone and its corresponding anthrahydroquinone to the requisite extents at the temperatures at which the reduction and oxidation steps are to be carried out.

Preferred solvents include a mixture of diethyl benzene and 2-ethyl hexanol; a mixture of diethyl benzene and tributyl phosphate; and diethyl benzene. A more preferred solvent is about a 1/1 ratio by volume mixture of diethyl benzene and 2-ethyl hexanol.

Water is not required but is preferably added to the reaction system to solubilize and isolate as a dispersed phase the alkali metal salt of the anthrahydroquinone produced. The salt otherwise generally has a low solubility in the organic solvents used and tends to blind off the amalgam surface thus cutting down on the efficiency of the reduction step. Because of the basic nature of the anions of the anthrahydroquinones, e.g. alkali metal salts of anthrahydroquinone, the reaction medium becomes alkaline when water is employed. The maximum quantity of water employed is that which can be dispersed as a separate phase in the organic solvent while maintaining the organic solvent as the continuous phase. As a minimum water is preferably provided in an amount sufficient to dissolve substantially all of the alkali metal salt of the anthrahydroquinone to be formed calculated on the amount of alkali metal dispersed in the continuous organic phase based on the reaction of 2 gram atoms of alykali metal to reduce one mole of anthraquinone reactant. The lowest possible ratio of water to organic solvent is preferred. A good ratio of water to solvent is about 3/20. The principal factor, however, is that the water is dispersed in the organic solvent as a separate phase so that the organic solvent is present as the continuous phase in the reaction system during the reduction of the anthraquinone reactant.

Though sodium amalgam is preferred for use in the invention, any of the alkali metal amalgams are suitable. Amalgams containing about 0.1% to about 0.5%, preferably about 0.3%, by weight alkali metal, such as are conventionally produced in mercury cell electrolysis, are suitable for use in the invention.

The alkali metal depleted amalgam phase is preferably separated from the reaction system prior to the auto-oxidation step.

The choice of the acid used in neutralizing the alkali metal salt of the hydroquinone will be dictated in part by the desirability of the corresponding salt which is produced. In general any acid having a dissociation constant, $K_a$, of $10^{-8}$ or greater will be suitable. Examples of such acids are hydrochloric (HCl), sulfuric ($H_2SO_4$), sulfurous acid ($H_2SO_3$), phosphoric acid ($H_3PO_4$), carbonic acid ($H_2CO_3$) and carboxylic acids, such as, e.g., acetic acid ($CH_3COOH$).

In practicing one embodiment of the present novel process of the invention, and referring to the drawing, dissolved 2-ethyl anthraquinone (EAQ), for example, is introduced from a head tank 1 into a stirred reactor 2 at a temperature of, e.g., about 37° C. concurrently but separately with water and amalgam to produce the sodium salt of the corresponding hydroquinone. The hydroquinone reaction mass (and some unreacted EAQ) is continually removed from the reactor 2 or reducing tank to a stirred acidifying tank 3, whereupon, it is neutralized with, e.g., hydrochloric acid resulting in a two-phase mixture. The elemental mercury resulting from the reduction step is recovered and sent to a mercury cell 4 for conversion into more sodium amalgam. Upon acidification, the resulting aqueous solution of sodium chloride is separated and used as a wash solution 5 for EAQ later in the process. It is then either discarded or used to recover the salt therefrom. The hydroquinone emerges in a liquid organic phase from the acidifier 3 and is then sparged with oxygen or air in an oxidizing tank 6 after having been washed 7 and cooled 8. In the oxidation reaction hydrogen peroxide is formed and the hydroquinone is reconverted to the anthraquinone.

The peroxide is separated in the extractor 11 from the anthraquinone which is then washed 9, cooled 10, and recycled for use in the process again. The aqueous hydrogen peroxide extract is converted by evaporation 12 to a concentrate. Before the $H_2O_2$ is concentrated, however, it is scrubbed 13 or cleaned to remove any residual EAQ. The EAQ recovered from the scrubber is recycled for use back to an EAQ make-up tank 14 which is used to supplement or make-up for any loss of EAQ in the process.

By reducing anthraquinone in the manner and by the procedures set forth herein, an alkali metal salt of anthrahydroquinone can be prepared. Over-reduction of the anthraquinone reactant is substantially reduced. Without limiting the scope of the invention by an expression of the theory of the reaction it is thought that over-reduction is minimized by maintaining conditions such that a maximum proportion of the produced anthrahydroquinone is present in the form of its anion, e.g. alkali metal salt, so long as reducing conditions prevail and that contact between the anthrahydroquinone anion and unreacted amalgam is minimized. This is accomplished by assuring that the liquid organic solvent is the continuous phase reaction system; that at a maximum about 2 gram atoms of alkali metal are provided for one gram mole of anthraquinone reactant; and that the organic solvent is one in which the alkali salt of anthrahydroquinone is substantially insoluble. Additionally, the solvent is also selected to be a relatively good solvent for the anthraquinone and a relatively poor solvent for the anthrahydroquinone at the reduction temperature employed.

The following examples serve to further illustrate the present invention but are not to be construed as limiting the invention thereto.

EXAMPLE I

The reference superscript numbers appearing throughout Example I are for use in Examples II through VIII which follow, as described hereinafter.

A working solution was prepared containing 100 gm./l. of ethyl anthraquinone [1] dissolved in a solvent composed of 15 percent tributyl phosphate and 85 percent diethyl benzene [2] by volume. Ten ml. [3] of this solution was introduced into a nitrogen purged separatory funnel, to which was then added 1.5 ml. water [4] and 43.03 gm. of sodium amalgam.[5] The organic working solution contained 4.24 millimoles [6] (mmoles) of the ethyl anthraquinone; the amalgam contained 0.237 percent [7] by weight of sodium or 4.53 mmoles.[8] The separatory funnel was vigorously shaken for 5 minutes during which time the formation of the red colored disodium anthraquinone salt was observed. The mercury phase was removed from the bottom of the funnel. This gave a negative result when tested for residual sodium.

To neutralize the hydroquinone salt and form the desired hydroquinone solution in the organic phase, 2.25 ml. of 23.6 percent by weight aqueous $NaHSO_3$ solution [9] was added to the funnel. After 2 minutes vigorous agitation the aqueous phase was allowed to settle and withdrawn from the funnel. This salt solution contained roughly $1HSO_3^-/3SO_3^=$ [10] and had a pH of about 7.0.[11] The last traces of this aqueous solution were removed from the dark green colored organic phase with one 6 ml. water wash.

The organic solution was analyzed and found to contain 51.2 gm./l. of ethyl anthrahydroquinone [12] or a total of 2.17 mmoles.[13] In this example 51.2 percent [14] of the initial quinone was reduced, giving a 95.8 percent [15] efficiency for the production of the hydroquinone from sodium amalgam.

Four milliliters [16] of the solution containing 0.868 mmole [17] hydroquinone were placed in a second separatory funnel and oxided with a stream of air for 10 minutes.[18] The organic solution, which reverted to its initial yellow color during this procedure was contacted five times with 5 ml. portions of water in order to extract the hydrogen peroxide product. Analysis of the combined aqueous phases indicated that 0.820 mmole [19] of peroxide had been produced. The efficiency of obtaining hydrogen peroxide from auto-oxidation of the hydroquinone in this manner was 94.2 percent.[20]

EXAMPLES II–VIII

The procedure of Example I was repeated a number of times except that different materials and concentrations thereof were employed in each case. These other materials and concentrations are set forth in tabular form in the following tables wherein the particular material and amount is referenced by the numbers in the left hand column which correspond to the superscript numbers appearing throughout Example I. By reference to these numbers and following the procedural sequence of Example I, substituting the data of said tables as indicated by said reference numbers. Examples II through VIII will be readily understood while eliminating pages of duplicate procedural language.

---

[1] See reference 1 in Tables I and II.
[2] See reference 2 in Tables I and II.
[3] See reference 3 in Tables I and II.
[4] See reference 4 in Tables I and II.
[5] See reference 5 in Tables I and II.
[6] See reference 6 in Tables I and II.
[7] See reference 7 in Tables I and II.
[8] See reference 8 in Tables I and II.
[9] See reference 9 in Tables I and II.
[10] See reference 10 in Tables I and II.
[11] See reference 11 in Tables I and II.
[12] See reference 12 in Tables I and II.
[13] See reference 13 in Tables I and II.
[14] See reference 14 in Tables I and II.
[15] See reference 15 in Tables I and II.
[16] See reference 16 in Tables I and II.
[17] See reference 17 in Tables I and II.
[18] See reference 18 in Tables I and II.
[19] See reference 19 in Tables I and II.
[20] See reference 20 in Tables I and II.

TABLE I

| | Example II | Example III | Example IV | Example V |
|---|---|---|---|---|
| Reference No.: | | | | |
| 1 | 112 gm./l. tert butyl anthraquinone. | 95 gm./l. tert butyl anthraquinone. | 115 gm./l. ethyl anthraquinone. | 60 gm./l. ethyl anthraquinone. |
| 2 | 25 percent benzyl alcohol, 75 percent diethyl benzene. | 20 percent tributyl phosphate, 80 percent diethyl benzene. | 50 percent tributyl phosphate, 50 percent ethyl benzene. | 60 percent diisobutyl carbinol, 40 percent para xylene. |
| 3 | 10 ml. | 10 ml. | 10 ml. | 10 ml. |
| 4 | 1.5 ml. 0.01 M NaOH. | 1.5 ml. 0.01 M NaOH. | | 1.0 ml. water. |
| 5 | 31.48 gm. | 67.68 gm. | 85.99 gm. | 28.38 gm. |
| 6 | 4.24 mmoles. | 3.41 mmoles. | 4.87 mmoles. | 2.54 mmoles. |
| 7 | 0.237 percent. | 0.236 percent. | 0.236 percent. | 0.235 percent. |
| 8 | 3.23 mmoles. | 6.95 mmoles. | 8.82 mmoles. | 2.90 mmoles. |
| 9 | 1.90 ml. of 20 percent by weight $NaHSO_4$. | 2.60 ml. 4 M $NaH_2PO_4$. | 0.84 ml. 50 percent by weight $H_2SO_4$. | 2.45 ml. of 1.22 M HCl. |
| 10 | $1\ HSO_4^-/9SO_4^=$ | $1\ H_2PO_4^-/2HPO_4^=$ | $1\ HSO_4^-/1SO_4^=$ | Substitute sentence: this salt brine had a pH of 2.7. |
| 11 | pH 2.8. | pH 7.1. | pH 1.8. | |
| 12 | 38.7 gm./l. tert butyl anthrahydroquinone. | 84.2 gm./l. tert butyl anthrahydroquinone. | 98.3 gm./l. ethyl anthrahydroquinone. | 32.6 gm./l. ethyl anthrahydroquinone. |
| 13 | 1.47 mmole. | 3.19 mmole. | 4.17 mmole. | 1.38 mmole. |
| 14 | 34.7 percent. | 93.5 percent. | 85.5 percent. | 54.4 percent. |
| 15 | 90.9 percent. | 91.8 percent. | 94.5 percent. | 95.3 percent. |
| 16 | 4 ml. | 2.8 ml. | 4 ml. | 4 ml. |
| 17 | 0.588 mmole. | 0.893 mmole. | 1.67 mmole. | 0.552 mmole. |
| 18 | Air for 10 minutes. | Oxygen for 5 minutes. | Oxygen for 5 minutes. | Oxygen for 8 minutes. |
| 19 | 0.364 mmole. | 0.824 mmole. | 1.24 mmole. | 0.516 mmole. |
| 20 | 61.9 percent. | 92.4 percent. | 74.7 percent. | 93.5 percent. |

TABLE II

| | Example VI | Example VII | Example VIII |
|---|---|---|---|
| Reference No.: | | | |
| 1 | 50 gm./l. ethyl anthraquinone. | 60 gm./l. ethyl anthraquinone. | 50 gm./l. ethyl anthraquinone. |
| 2 | 50 percent 2 octanol, 50 percent para cymene. | 50 percent 2 ethyl hexanol, 50 percent diethyl benzene. | 50 percent methyl benzoate, 50 percent diethyl benzene. |
| 3 | 10 ml. | 20 ml. | 20 ml. |
| 4 | 1.5 ml. water. | 2.0 ml. water. | 2.0 ml. water. |
| 5 | 33.12 gm. | 56.72 gm. | 43.70 gm. |
| 6 | 2.12 mmoles. | 5.08 mmoles. | 4.24 mmoles. |
| 7 | 0.236 percent. | 0.237 percent. | 0.237 percent. |
| 8 | 3.40 mmoles. | 5.85 mmoles. | 4.50 mmoles. |
| 9 | 2.00 ml. of 1.75 M acetic acid. | 2.19 ml. of 4 M $NaH_2PO_4$. | 1.69 ml. of 4 M $NaH_2PO_4$. |
| 10 | | $1\ H_2PO_4^-/2HPO_4^=$ | $1\ H_2PO_4^-/2HPO_4^=$. |
| 11 | Substitute sentence: This salt brine had a pH of 6.4. | pH of about 7.0. | pH of 7.1. |
| 12 | 35.3 gm./l. ethyl anthrahydroquinone. | 34.1 gm./l. ethyl anthrahydroquinone. | 20.8 gm./l. ethyl anthrahydroquinone. |
| 13 | 1.50 mmole. | 2.89 mmole. | 1.76 mmole. |
| 14 | 70.6 percent. | 56.8 percent. | 41.6 percent. |
| 15 | 88.0 percent. | 98.7 percent. | 78.3 percent. |
| 16 | 4 ml. | 5 ml. | 5 ml. |
| 17 | 0.599 mmole. | 0.722 mmole. | 0.440 mmole. |
| 18 | Oxygen for 2 minutes. | Oxygen for 4 minutes. | Oxygen for 3 minutes. |
| 19 | 0.575 mmole. | 0.689 mmole. | 0.326 mmole. |
| 20 | 96.2 percent. | 95.3 percent. | 74.1 percent. |
| * | The last traces of the aqueous phase were removed by two 10 ml. 5% by weight $NaHCO_3$ and one 10 ml. $H_2O$ wash in this example instead of by one 6 ml. $H_2O$ wash as in Example I. | The last traces of the aqueous phase were removed by two 10 ml. $H_2O$ washes. | The last traces of the aqueous phase were removed by two 10 ml. $H_2O$ washes. |

EXAMPLE IX

A working solution was prepared containing 100 gm./l. of ethyl anthraquinone dissolved in diethyl benzene. Ten milliliters of this solution was introduced into nitrogen purged separatory funnel, to which was then added 3.0 ml. water and 21.71 gm. of sodium amalgam. The organic working solution contained 4.24 mmoles of the quinone; the amalgam contained 0.237% by weight of sodium or 2.24 mmoles. The separatory funnel was vigorously shaken for 5 minutes during which time the formation of the red colored disodium anthrahydroquinone salt was observed. The mercury phase was removed from the bottom of the funnel and gave a negative result when tested for residual sodium.

The hydroquinone salt was neutralized by the addition of 3.0 ml. of 4 M aqueous $NaH_2PO_4$ solution, giving a final aqueous composition containing roughly $5H_2PO_4^-/1HPO_4^=$. The organic phase at this point consisted of a slurry of ethyl anthrahydroquinone solid dispersed in the diethyl benzene solution. In order to quantitatively analyze this mixture, 2.0 ml. tributyl phosphate was added to solvate the hydroquinone. After the funnel was agitated for 5 minutes, the solution was found to contain 20.6 gm./l. of ethyl anthrahydroquinone or a total of 1.05 mmoles. In this example 46.7% of the initial quinone was reduced, giving a 93.5% efficiency for the production of the hydroquinone from sodium amalgam.

EXAMPLE X

The following procedure was carried out to illustrate the application of the present method of quinone reduction to the production of hydrogen peroxide. In a manner similar to the preceding example, 10 ml. of ethyl anthraquinone was reduced with 2.22 mmoles of sodium contained in 21.46 gm. of amalgam. After the neutralization with $NaH_2PO_4$ solution, the system was heated to between 90° C. and 100° C. to render the ethyl anthrahydroquinone soluble in the diethyl benzene solvent. The last trace of the aqueous solution was removed from the dark green colored organic phase with two 5 ml. water washes at about 95° C.

The hydroquinone solution was allowed to cool to ambient temperature and the resulting slurry was then oxidized with a stream of oxygen for 5 minutes. The organic solution, which had reverted to its original yellow color, was then contacted four times with 5 ml. portions of water in order to extract the hydrogen peroxide product. Analysis of the combined aqueous phases indicated that 0.800 mmole of peroxide had been produced. The efficiency of obtaining hydrogen peroxide by this method from the sodium amalgam used was 71.8%. From the preceding reduction efficiency of 93.5%, the efficiency of obtaining hydrogen peroxide from auto-oxidation of the hydroquinone was calculated to be 76.9%.

EXAMPLE XI

The invention may also be carried out using 2-ethyl hexanol as the sole solvent to dissolve, e.g., ethylanthraquinone. A temperature of from about 50° to about 60° C. is employed to conduct the amalgam-quinone reaction with the other conditions as to quantities, time, procedure and the like being essentially the same as in the previous examples. A satisfactory yield of hydrogen peroxide is thereby obtained in the order of that obtained in the previous examples.

EXAMPLE XII

The examples above may be repeated using essentially the same materials, e.g. tributyl phosphate, quantities, time, procedures and the like, but recovering the hydrogen peroxide product by steam distillation since tributyl phosphate boils at 289° C. and hydrogen peroxide boils at 153° C. at standard conditions. A high yield of peroxide product is recovered in the order obtained in the previous examples.

Various modifications and changes may be made in the present invention without departing from the spirit or scope thereof and it is understood that the present invention is only limited as defined in the appended claims.

What is claimed is:

1. In the process for preparing hydrogen peroxide consisting of the steps of reducing an anthraquinone with an alkali metal amalgam in the presence of water and an organic solvent for said anthraquinone to form hydroanthraquinone in solution and oxidizing said hydroanthraquinone in solution by contacting it with an oxygen containing gas to form hydrogen peroxide and regenerate anthraquinone the improvement which comprises:

(a) providing a liquid reaction system having a neutral to alkaline pH, said system comprising water and a liquid substantially water immiscible organic solvent which solubilizes anthraquinone and an anthrahydroquinone derived from said anthraquinone at the reaction temperature employed, said organic solvent having dissolved therein from about 0.1 to about 2.0 moles of anthraquinone per liter of said organic solvent, and said liquid reaction system further characterized in that said water and organic solvent are provided in a volume ratio such that the water is present as a distinct phase dispersed in a continuous phase of said organic solvent;

(b) contacting said liquid reaction system while maintained at a temperature up to about 100° C. with an alkali metal and amalgam provided in an amount to provide from about 0.1 to about 2.0 gram-atoms of alkali metal per mole of said anthraquinone to produce an alkaline reaction system containing distinct depleted amalgam, organic solvent and aqueous phases;

(c) neutralizing said alkaline reaction system with an acid of $K_a$ greater than $10^{-8}$;

(d) separating said organic solvent phase from said neutralized reaction system;

(e) contacting said organic solvent phase with an oxygen containing gas while maintaining said organic solvent phase at a temperature of up to about 100° C. to produce hydrogen peroxide; and (f) recovering said hydrogen peroxide.

2. The process as defined in claim 1 wherein the organic solvent is one in which the anthraquinone reactant is soluble to at least about 50 grams of anthraquinone reactant per liter of solvent and one in which an equivalent anthrahydroquinone is soluble at a maximum of about 100 grams per liter of solvent at the reduction temperature employed.

3. The process as defined in claim 1 wherein the alkali metal amalgam is employed in an amount to provide up to about 1 mole of alkali metal per 1 mole of anthraquinone reactant.

4. The process as defined in claim 1 wherein the anthraquinone reactant and alkali metal amalgam are reacted at a temperature of from about 40° to about 60° C.

5. The process of as defined in claim 1 wherein the alkali metal amalgam is sodium amalgam.

6. The process as defined in claim 1 wherein the organic solvent comprises a mixture of diethyl benzene and tributyl phosphate.

7. The method as defined in claim 1 wherein the organic solvent comprises a mixture of diethyl benzene and 2-ethyl hexanol.

8. The process as defined in claim 1 wherein the anthraquinone reactant is an alkyl anthraquinone.

References Cited

UNITED STATES PATENTS

| Re. 20,769 | 6/1938 | Soule | 23—207 |
|---|---|---|---|
| 2,935,381 | 5/1960 | Darbee et al. | 23—207 |
| 3,328,128 | 6/1967 | Käbisch | 23—207 |

OTHER REFERENCES

MacMullin: By-Products of Amalgam-Type Chlorine Cell Organic Reduction With Sodium Amalgams, "Chemical Engineering Progress," vol. 46, No. 9, pp. 451–453 (1950).

OSCAR R. VERTIZ, Primary Examiner

H. S. MILLER, Assistant Examiner

U.S. Cl. X.R.

260—369